United States Patent
Larson et al.

(10) Patent No.: US 8,388,255 B2
(45) Date of Patent: Mar. 5, 2013

(54) DOG-TYPE LOCKOUT AND POSITION INDICATOR ASSEMBLY

(75) Inventors: Eric D. Larson, Tomball, TX (US); John V. Leba, Cypress, TX (US); Robert A. Blue, Houston, TX (US)

(73) Assignee: Vetco Gray Inc., Houston, TX (US)

( * ) Notice: Subject to any disclaimer, the term of this patent is extended or adjusted under 35 U.S.C. 154(b) by 225 days.

(21) Appl. No.: 12/502,095

(22) Filed: Jul. 13, 2009

(65) Prior Publication Data

US 2011/0008099 A1    Jan. 13, 2011

(51) Int. Cl.
*F16D 1/116* (2006.01)

(52) U.S. Cl. ............... 403/316; 403/27; 403/31; 285/26; 285/922

(58) Field of Classification Search ............... 403/109.7, 403/109.2, 109.5, 31, 315–317, 320; 285/26, 285/29, 920, 922; 166/242.6
See application file for complete search history.

(56) References Cited

U.S. PATENT DOCUMENTS

| | | | | | |
|---|---|---|---|---|---|
| 3,151,892 | A | * | 10/1964 | Word, Jr. et al. | 285/123.2 |
| 3,248,132 | A | * | 4/1966 | Pierce, Jr. | 285/123.1 |
| 3,321,217 | A | | 5/1967 | Ahlstone | |
| 3,489,439 | A | * | 1/1970 | Word, Jr. | 285/123.9 |
| 3,765,642 | A | * | 10/1973 | Nelson | 251/14 |
| 3,791,442 | A | * | 2/1974 | Watkins | 166/352 |
| 3,827,728 | A | * | 8/1974 | Hynes | 285/90 |
| 4,491,345 | A | | 1/1985 | Regan | |
| 4,606,557 | A | * | 8/1986 | Coffey | 285/18 |
| 4,653,778 | A | | 3/1987 | Alandy | |
| 4,770,250 | A | * | 9/1988 | Bridges et al. | 166/382 |
| 5,149,143 | A | * | 9/1992 | Howell | 285/18 |
| 5,951,066 | A | * | 9/1999 | Lane et al. | 285/364 |
| 6,017,168 | A | * | 1/2000 | Fraser et al. | 405/224.4 |
| 6,045,296 | A | | 4/2000 | Otten et al. | |
| 6,598,849 | B2 | * | 7/2003 | Hoang et al. | 251/62 |
| 6,684,897 | B2 | * | 2/2004 | Sundararajan | 137/15.19 |
| 7,121,345 | B2 | * | 10/2006 | Bartlett | 166/345 |
| 7,274,989 | B2 | * | 9/2007 | Hopper | 702/6 |
| 8,087,845 | B2 | * | 1/2012 | Lin et al. | 403/350 |
| 2007/0044973 | A1 | | 3/2007 | Fraser et al. | |
| 2008/0175672 | A1 | * | 7/2008 | Fraser | 405/170 |

FOREIGN PATENT DOCUMENTS

| | | |
|---|---|---|
| EP | 1947290 A2 | 7/2008 |
| FR | 2928958 A | 9/2009 |
| WO | 0024998 A1 | 5/2000 |

OTHER PUBLICATIONS

Search Report issued in connection with British Application No. GB1011600.2., Oct. 26, 2010.

* cited by examiner

*Primary Examiner* — Daniel P. Stodola
*Assistant Examiner* — Jonathan Masinick
(74) *Attorney, Agent, or Firm* — Bracewell & Giuliani LLP

(57) ABSTRACT

A connector assembly for connecting two members that allows manual lockdown to prevent accidental disengagement. The connector assembly can be used to connect a tension ring to a housing on a riser by using a lower set of hydraulically actuated dogs. A set of upper hydraulically actuated dogs on the connector assembly can be used to connect the tension ring to a diverter housing mounted on a rig. The connector assembly also has position indicators that ride along with the dogs to indicate whether the dogs are in the engaged or disengaged position.

13 Claims, 4 Drawing Sheets

DOG-TYPE LOCKOUT AND POSITION INDICATOR ASSEMBLY

FIELD OF INVENTION

This invention relates in general to tension rings and in particular to a dog-type lockout assembly for a tension ring that has a manual lockdown feature and indicates the dog position.

BACKGROUND OF THE INVENTION

Locking mechanisms for oilfield equipment often include a cylindrical locking mechanism called a dog. The dog is put into a locking position between two components, such as a tension ring and a housing, to hold a position or take a load. For example, the dog can be part of a tension ring that can maintain a riser in stable tension when offshore platforms heave. When the riser is retrieved, the dog can be locked to a housing located on the riser to prevent it from falling and injuring personnel. An additional dog can lock onto another component for storage.

To prevent the accidental unlocking of the dogs, a manual lockout can be employed to secure the dog in a locked position. When the lockout is engaged, the dog is locked in an engaged position. When the lockout is disengaged, the dog is free to move between an engaged and a disengaged position. However, the actual position of the dog is unknown. For example, when a lockout is disengaged, the dog may still be in the engaged position. This may cause problems for the operators.

A need exists for a technique to manually lockdown dogs and indicate whether a dog is in a locked or unlocked position. The following technique may solve these problems.

SUMMARY OF THE INVENTION

In an embodiment of the present technique, a dog-type lockout assembly is provided that integrates a position indicator that can provide visual confirmation as to whether the dog is in the engaged or disengaged position. The dogs can be manually locked down in the engaged position to prevent the dog from being accidentally disengaged. The dog-type lockout assembly allows two components, such as a tension ring and a housing, to be locked together to thereby hold a position or take a load.

In the illustrated embodiment, the dog-type lockout assembly has a tension ring. The tension ring can have eyelets disposed circumferentially around its exterior and adapted to receive wires that attach to the structure of a rig. The ring can be adapted to maintain tension on a drilling riser comprised of several thousand feet of pipe and extends from a rig down to the seafloor. The tension is applied to the riser via the wires attached to the ring to thereby prevent the riser from collapsing. The tension ring can apply tension to the riser through a housing connected to a slip joint.

When retrieving the drilling riser, in this example, the reaction point between the housing and the tension ring is removed and the tension wires go slack, allowing the tension ring to fall. This can be very dangerous to personnel working on platforms below the tension ring. To prevent the tension ring from falling during retrieval of the riser, a dog is used with the tension ring to lock into a mating passage on the housing. This prevents the tension ring from falling and allows the ring to be carried upwards to where another component can be mounted. The component can be, for example, a diverter support housing mounted on the rig. Another set of dogs on the tension ring can engage with the diverter support housing when the tension ring contacts the diverter support from below. The tension ring can be stored in this position.

A hazard can arise if the dogs are accidentally disengaged by actuating the dogs hydraulically. To prevent this hazard, a manual lockdown can be used to ensure the dog remains in the engaged position. The lockdown can be a mechanically driven screw located behind the engaged dog. When the lockdown is retracted the dog can float into both engaged and disengaged positions. When the lockdown is extended, the dog is only permitted to be in an engaged position. The solution adds a floating ring and position indicator rod to the dog that rides along with the dog to show the position of the dog. The position indicator will visually appear recessed within the ring body when the dog is in the engaged position and will appear retracted from the ring body when the dog is in the disengaged position. The floating ring can easily be radially positioned to make it easier to manufacture an assembly.

The dog-type lockout thus integrates position indication in one assembly. The combination of features allowing manual lockdown of the dogs into an engaged position and providing visual confirmation as to whether the dogs are in an engaged or disengaged position, advantageously increase safety by preventing accidental disengagement of the dogs and providing a simple way to ascertain the position of the dogs.

DETAILED DESCRIPTION OF THE INVENTION

Figure 1:
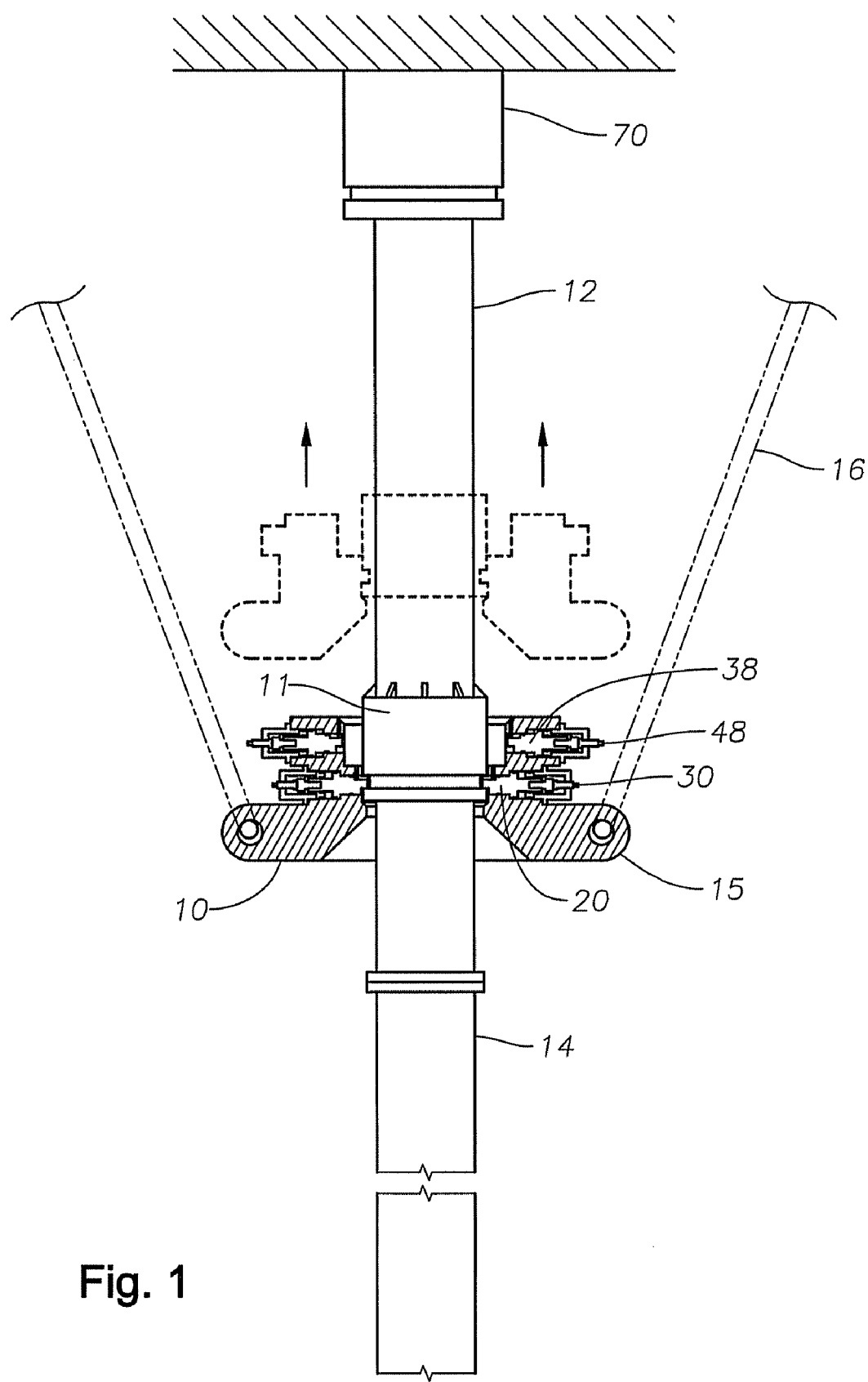
FIG. 1 is a sectional view of a tension ring in contact with a housing and lower dogs in the engaged position, in accordance with an embodiment of the invention.

Referring to FIG. 1, an embodiment of the invention shows a tensioner ring or connector assembly 10 for connecting two members. One member can be, for example, an outer member such as the riser tensioner ring 10 itself and the other member can be, for example, an inner member such as a housing 11 on a slip joint 12 connected to a riser 14.

In this example, the connector assembly 10 can have eyelets 15 disposed circumferentially around its exterior and adapted to receive wires 16 that attach to a tension system that maintains constant tension. The tensioner ring 10 can be adapted to maintain tension on a drilling riser 14 comprised of several thousand feet of pipe that extends from a rig down to the seafloor. The tension is applied to the riser 14 via the wires attached to the ring 10 to thereby prevent the riser 14 from collapsing. The tensioner ring 10 can apply tension to the riser 14 through a housing 11 connected to a slip joint 12.

Figure 2:
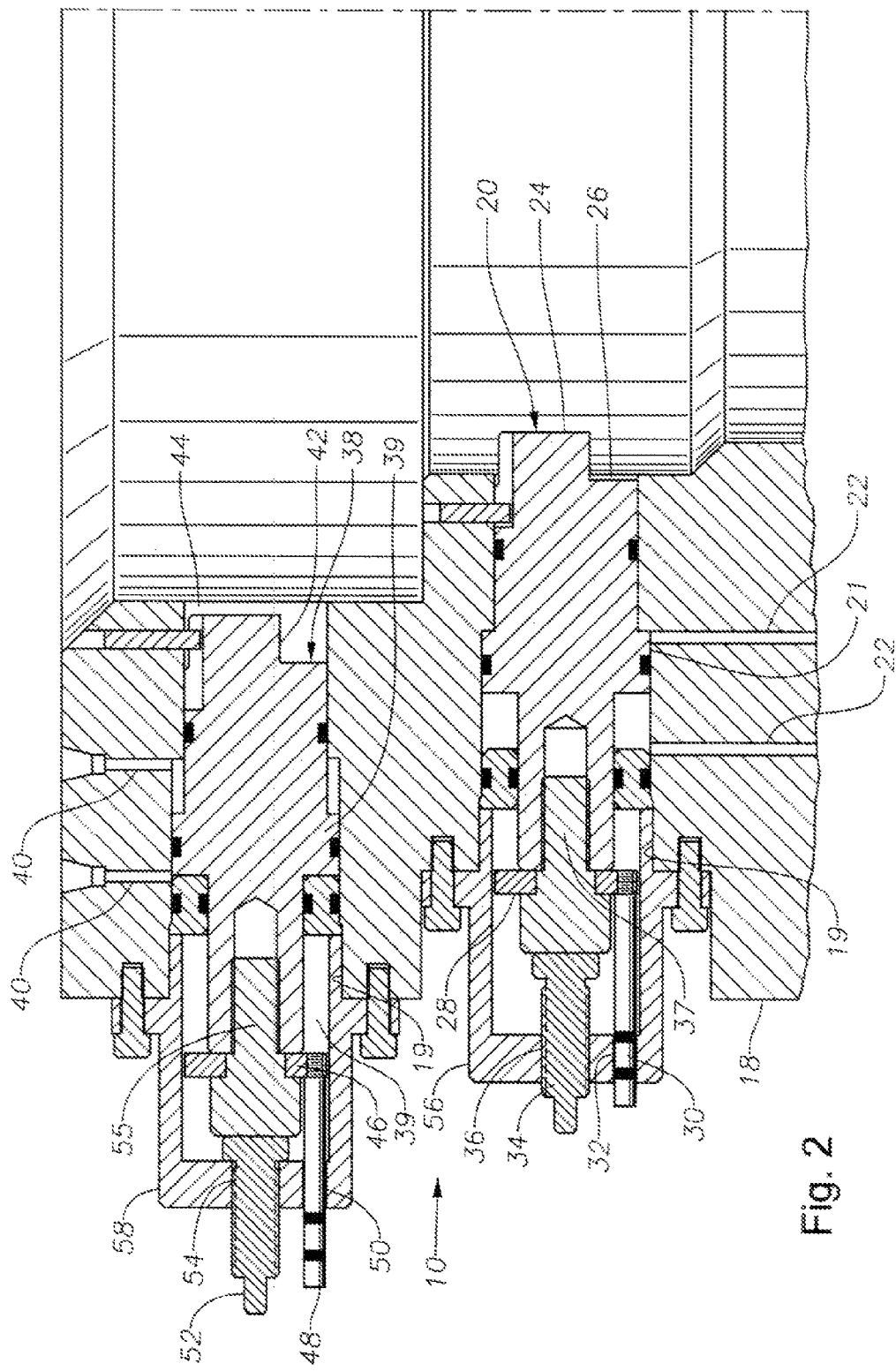
FIG. 2 is an enlarged sectional view of the dog and position indicator within a tensioner ring, in accordance with an embodiment of the invention.

Referring to FIG. 2, the tensioner ring 10 can comprise a frame or body 18 having at least one fluid cylinder or opening 19. An actuator comprising a lower dog 20 that is movable between an engaged position and a disengaged position in a lower fluid cylinder 21 in response to fluid pressure. Lower dog 20 has a piston 21 that sealingly engages opening 19. Hydraulic lines 22 can provide the fluid pressure to be exerted on piston 21. The lower dog 20 has an interior end 24 that extends through an interior opening 26 on the interior of the frame 18 when the lower dog 20 is in the engaged position. In the engaged position the lower dog 20 engages a mating hole or groove formed on the housing 11. To indicate the position of the lower dog 20 a collar or floating ring 28 connected to the lower dog 20, carries a lower position indicator 30. In the illustrated embodiment, the lower position indicator 30 is recessed within an aperture or opening 32 on the frame 18 when the lower dog 20 is in the engaged position, thus providing a visual confirmation of dog's position. When the lower dog 20 is in the disengaged position, the lower position indicator 30 will extend out from the aperture 32 in the illustrated embodiment. Position indicator 30 is a rod that is parallel to an offset from an axis of opening 19. However, devices other than a rod may be used as a position indicator for the lower dog 20.

The openings 19 on the frame 18 can be covered by lower and upper caps 56, 58. The lower cap 56 has a threaded opening 36. The aperture 32 for the lower position indicator 30 can similarly be formed on the lower cap 56. The upper cap 58 can likewise have a threaded opening 54 that allows the upper locking member 52 to pass through it. The aperture 50 for the upper position indicator 48 can similarly be formed on the upper cap 58.

A lower lockdown member or screw 34 extends through threaded opening 36 of cap 56. In the illustrated embodiment, the lockdown member 34 is threaded to enable it to move between retracted and extended positions relative to the cap 56. Screw 34 has a base that abuts the head of a screw 37 attached to and forming part of lower dog 20. Extending the lower lockdown member 34 when the lower dog 20 is in the engaged position causes the lockdown member 34 to lock the lower dog 20 in the engaged position to prevent the dog 20 from moving to the disengaged position. The lower lockdown member 34 thus assures that the lower dog 20 will remain engaged to the housing 11 as the riser 14 is retrieved. Conversely, the lower dog 20 is free to move between the engaged and disengaged positions when the lower lockdown member 34 is in the retracted position.

Figure 3:
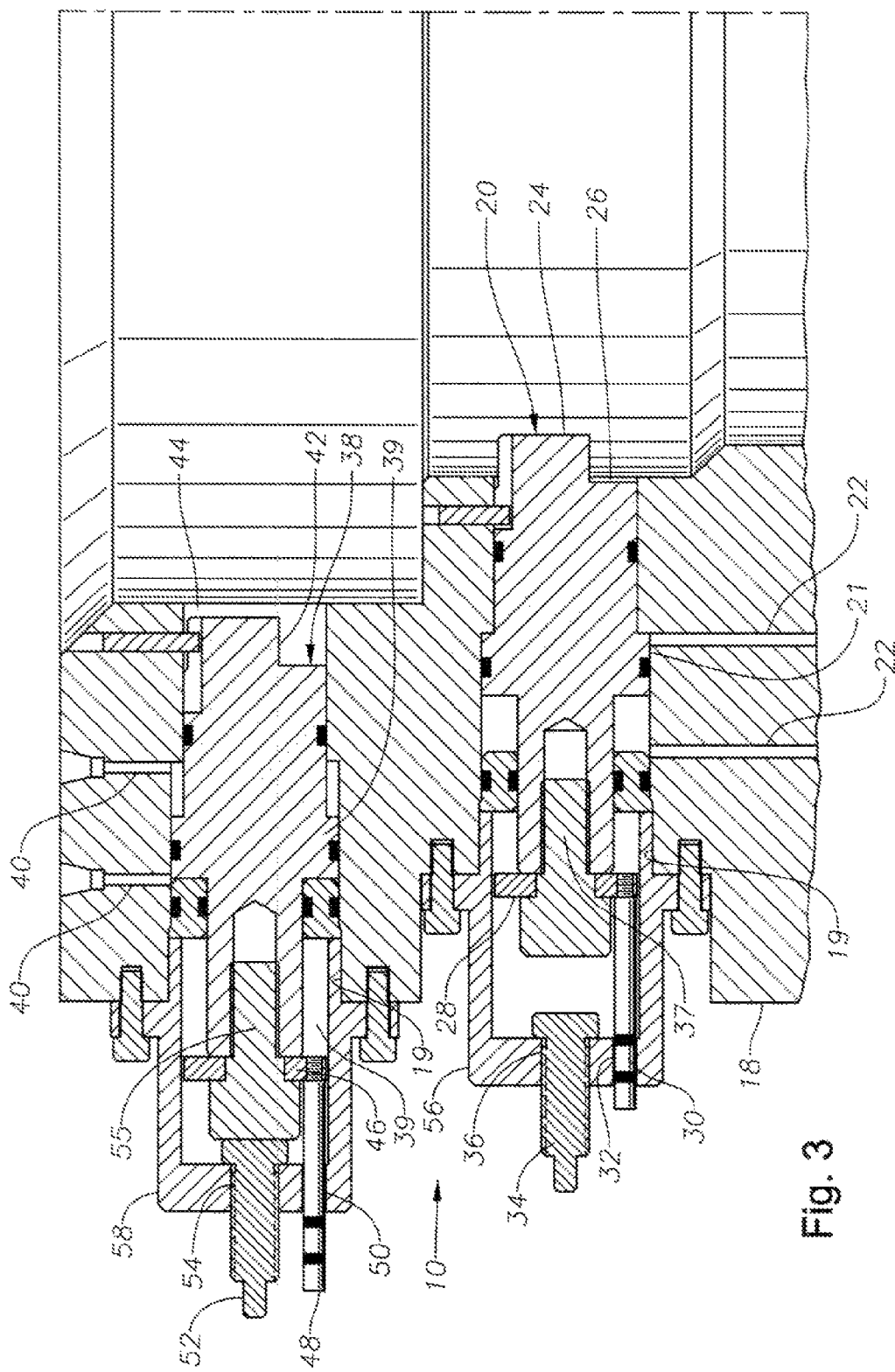
FIG. 3 is an enlarged sectional view of the dog and position indicator within a tensioner ring with the lockdown member retracted, in accordance with an embodiment of the invention.
Figure 4:
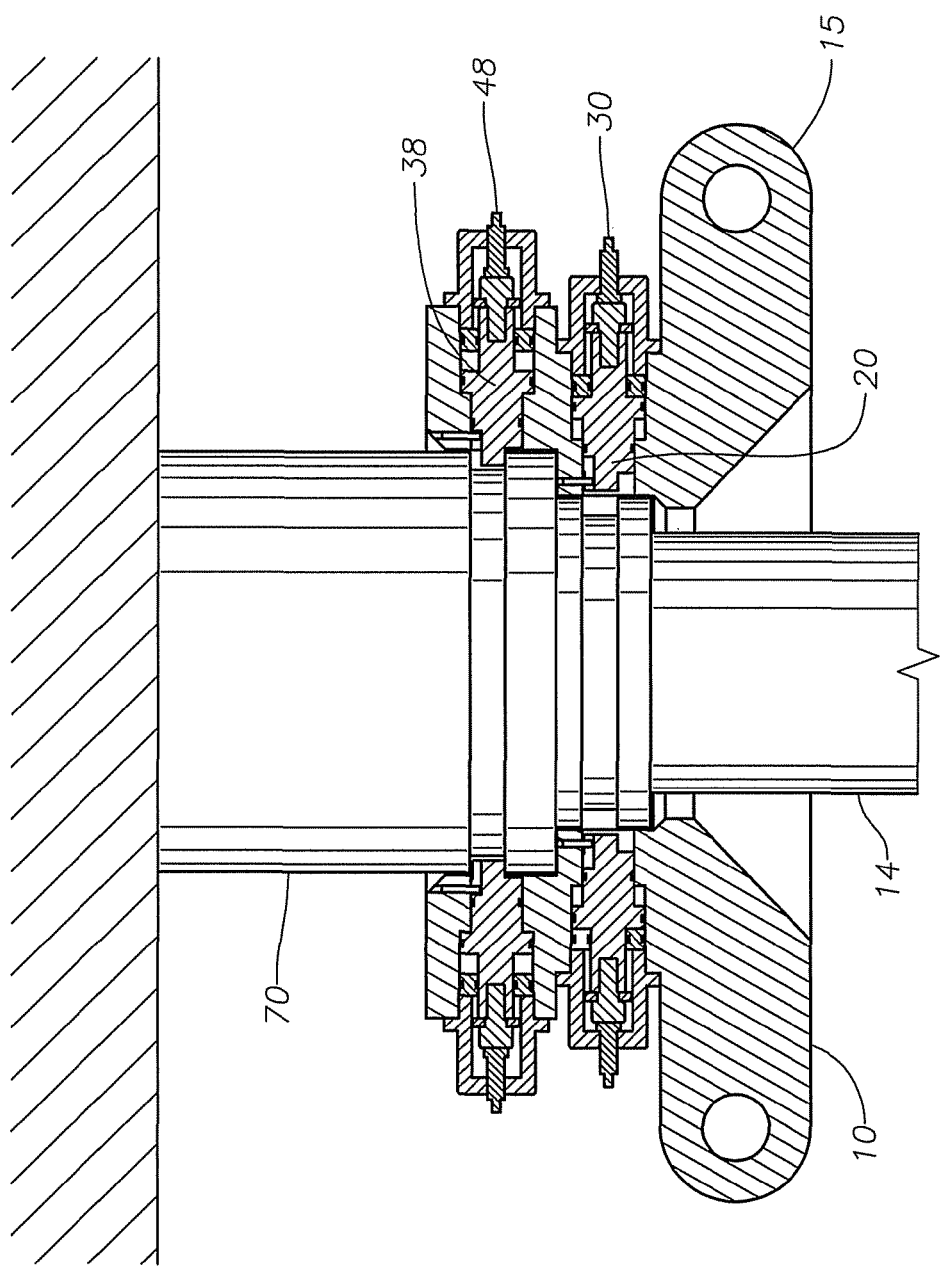
FIG. 4 is a sectional view of a tension ring in contact with a diverter housing and upper dogs in the locked position, in accordance with an embodiment of the invention.

Continuing to refer to FIG. 2, a similar locking mechanism can be used to store the housing 11 after the riser 14 is retrieved. An upper dog 38 can be located above the lower dog 20 and within the frame 18. The upper dog 38 has a piston 39 and slidingly moves between engaged and disengaged positions in an upper fluid cylinder 39 in response to fluid pressure. Hydraulic lines 40 can provide the fluid pressure. The upper dog 38 has an interior end 42 that can extend through an interior opening 44 on the interior of the frame 18 when the upper dog 38, is in the engaged position. In the engaged position the upper dog 38 engages a mating hole or groove formed on a member such as a diverter housing 70 (FIG. 3). To indicate the position of the upper dog 38 a collar or floating ring 46 connected to the upper dog 38 carries an upper position indicator 48. In the illustrated embodiment, the upper position indicator 48 is recessed within an aperture or opening 50 on the frame 18 when the upper dog 38 is in the locked position, thus providing visual confirmation of the dog's position. When the upper dog 38 is in the disengaged position, the upper position indicator 48 will extend out from the aperture 50 in this embodiment.

An upper lockdown member or screw 52 extends through a threaded opening 54 in cap 58. Threads on rotary screw 52 enable it to move between retracted and extended positions relative to cap 58. Screw 52 has a base that abuts the head of a screw 55 attached to and forming part of upper dog 38. Extending the upper lockdown member 52 when the upper dog 38 is in the engaged position causes the base of the lockdown member 52 to engage the upper dog 38 and prevents the dog from moving to the disengaged position. The upper lockdown member 52 thus assures that the upper dog 38 will remain engaged to the diverter housing 70 (FIG. 3) to allow storage of the housing 11 within the diverter housing 70. The upper dog 38 is free to move between the engaged and disengaged positions when the upper lockdown member 52 is in the retracted position as shown in FIG. 2.

The portion of the frame 18 that houses the upper dog 38 can be radially offset outward farther than lower dog 20. This offset creates an incrementally larger inner diameter at the upper dog 38 portion of the frame 18 that facilitates engagement with the diverter housing 70.

While the invention has been shown in only one of its forms, it should be apparent to those skilled in the art that it is not so limited but is susceptible to various changes without departing from the scope of the invention.

What is claimed is:

1. A drilling riser tensioner ring assembly, comprising:
an annular tensioner ring body having a central opening for receiving a tubular riser component and an outer surface having an outer cylindrical portion concentric with the central ring;
a plurality of bores integrally formed in the tensioner ring body, each of the bores extending radially through the tensioner ring body from the central opening to the outer surface relative to an axis of the central opening;
a plurality of hydraulic passages within the tensioner ring body, each of the hydraulic passages extending to one of the bores for delivering hydraulic fluid pressure to the bore;
a plurality of actuators, each of the actuators having a piston with a seal mounted thereto and carried within a respective one of the bores, the pistons being movable in response to fluid pressure applied to the bores via the hydraulic passages between an outer disengaged position and an inner engaged position in engagement with the riser component;
a plurality of lockdown supports, each of the lockdown supports being mounted in a fixed position to the outer surface of the tensioner ring body radially outward from a respective one of the pistons, relative to the axis; and
a plurality of lockdown members, each mounted to a respective one of the lockdown supports radially outward from a respective one of the pistons, each of the lockdown members being movable between retracted and extended positions relative to a respective one of the lockdown supports, such that movement of each of the lockdown members to the extended position while a respective one of the pistons is in the engaged position causes the lockdown member to abut an outer end of the piston and prevent the piston from moving to the disengaged member to abut an outer end of the piston and prevent the piston from moving to the disengaged position, wherein the piston is movable between the engaged and disengaged positions while the lockdown member is in the retracted position.

2. The assembly according to claim 1, wherein:
each of the lockdown supports has a lockdown opening through which one of the lockdown members extends, each of the lockdown openings being threaded; and
each of the lockdown members is threaded so that rotation of the lockdown member moves the lockdown member between the retracted and extended positions.

3. The assembly according to claim 1, further comprising:
a position indicator mounted to each of the pistons for movement therewith; and
each of the position indicators has an outer end extending through an aperture in a respective one of the lockdown supports.

4. The assembly according to claim 3, further comprising:
a collar mounted to each of the pistons; and
wherein each of the position indicators is mounted to a respective one of the collars.

5. The assembly according to claim 1, wherein each of the lockdown supports comprises a cap having a cylindrical sidewall secured to the outer surface of the tensioner ring body and a base in alignment with and spaced radially outward from a respective one of the pistons.

6. A drilling riser tensioner ring assembly, comprising:
an tensioner ring body having a central opening with an opening axis and an outer surface with a cylindrical portion concentric with the central opening;
a tubular riser component that lands within the central opening;
a plurality of bores integrally formed in the tensioner ring body, spaced around the central opening, and extending radially from the central opening to the outer surface of the tensioner ring body;
a piston carried within each of the bores, each of the pistons having a dog on an inner end for engaging the riser component, each of the pistons being movable along a bore axis between inner and outer positions in response to fluid pressure applied to the bore containing the piston;
a plurality of lockdown supports, each having a flat base mounted in a fixed position to the outer surface of the tensioner ring body radially outward from a respective one of the pistons relative to the bore axis, the base having a aperture;
a plurality of lockdown members, each extending through a respective one of the apertures radially outward of a respective one of the pistons, each lockdown member being manually movable from a retraced position to an extended position relative to the base, each of lockdown members having an inner position and the lockdown member in its extended position, each of t he pistons being freely movable in response to fluid pressure in the bore while a respective one of the lockdown members is in the retracted position; and
a position indicator coupled to each of the pistons for movement therewith and extending alongside a respective one of the lockdown members to indicate the position of each of the pistons.

7. The assembly according to claim 6, wherein each of the apertures comprises a threaded hole that receives a respective one of the lockdown members in threaded engagement.

8. The assembly according to claim 6, wherein:
each of the lockdown members is located on the bore axis of a respective one of the bores; and
each of the position indicators is located alongside and parallel with a respective one of the bore axes.

9. The assembly according to claim 8, wherein each of the position indicators protrudes through a hole in a respective one of the bases.

10. The assembly according to claim 6, further comprising:
a collar mounted to each of the pistons; and
wherein each of the position indicators is mounted to a respective one of the collars alongside the bore axis.

11. The assembly according to claim 6, wherein the bores further comprise a plurality of upper bores and a plurality of lower bores.

12. The assembly according to claim 6, wherein the tensioner ring assembly further comprises a plurality of eyelets adapted for receiving a cable.

13. A drilling riser tensioner ring assembly, comprising:
an annular tensioner ring body having a central opening for receiving a tubular riser component and an outer surface with a cylindrical portion concentric with the central opening;
a plurality of bores integrally formed in the tensioner ring body, each of the bores extending radially through the tensioner ring body from the central opening to the outer surface relative to an axis of the central opening;
a plurality of hydraulic passages within the tensioner ring body, each of the hydraulic passages extending to one of the bores;
a plurality of pistons, each of the pistons carried within one of the bores and being movable in response to fluid pressure applied to the hydraulic passages between an outer disengaged position and an inner engaged position with the riser component;
a plurality of lockdown assemblies for selectively securing the pistons in the engaged position, each of the lockdown assemblies comprising:
a lockdown support mounted in a fixed position to the outer surface of the tensioner ring body and having a base with a threaded aperture radially outward from one of the pistons, relative to the axis; and
a lockdown screw secured to the threaded aperture and being movable by rotation between an extended position with an inner end in abutment with an outer end of a respective one of the pistons and a retracted position with the inner end spaced radially outward from the outer end of the respective one of the pistons.

* * * * *